US012591122B2

(12) United States Patent
Cui

(10) Patent No.: US 12,591,122 B2
(45) Date of Patent: Mar. 31, 2026

(54) APPARATUSES AND METHODS FOR HIGH-SPEED LASER SCANNING

(71) Applicant: PURDUE RESEARCH FOUNDATION, West Lafayette, IN (US)

(72) Inventor: Meng Cui, West Lafayette, IN (US)

(73) Assignee: PURDUE RESEARCH FOUNDATON, West Lafayette, IN (US)

(*) Notice: Subject to any disclaimer, the term of this patent is extended or adjusted under 35 U.S.C. 154(b) by 235 days.

(21) Appl. No.: 18/172,139

(22) Filed: Feb. 21, 2023

(65) Prior Publication Data

US 2023/0266577 A1     Aug. 24, 2023

Related U.S. Application Data

(60) Provisional application No. 63/268,265, filed on Feb. 18, 2022.

(51) Int. Cl.
  *G02B 21/00*       (2006.01)
  *G02B 26/12*       (2006.01)

(52) U.S. Cl.
  CPC ....... *G02B 21/0048* (2013.01); *G02B 26/124* (2013.01); *G02B 26/125* (2013.01)

(58) Field of Classification Search
  CPC ............ G02B 21/0048; G02B 21/0076; G02B 26/124; G02B 25/125
  See application file for complete search history.

(56) References Cited

U.S. PATENT DOCUMENTS 4,564,739 A * 1/1986 Mattelin ............ B23K 26/0676
                                       219/121.75
4,838,679 A * 6/1989 Bille .................... A61B 5/0073
                                       351/205
(Continued)

FOREIGN PATENT DOCUMENTS

DE          19733195 A1 * 2/1999 ........... G02B 21/002
WO     WO-2015109323 A2 * 7/2015 ........... G02B 21/002
(Continued)

OTHER PUBLICATIONS

Easier English Student Dictionary 165 (2000). (Year: 2000).*
(Continued)

*Primary Examiner* — Jennifer D. Carruth

(57) ABSTRACT

High speed laser scanning systems and methods are disclosed for imaging target samples. Embodiments of the laser scanning systems and methods include separating a laser beam into two or more different pathways and pulsing light along the two or more pathways. The different pathways intersect the surface of a moving mirror at different locations and light traveling in a pathway that is being approached by an edge of the moving reflective surface is turned off while light traveling in a different pathway that is farther from the edge of the moving reflective surface is turned on. Embodiments include reflective surfaces that form a rotating polygonal scanner. Further embodiments include recombining the two or more different pathways, focusing the laser light on a test sample, and imaging the light reflected from the test sample.

20 Claims, 14 Drawing Sheets

(56) References Cited

U.S. PATENT DOCUMENTS

| | | | | | |
|---|---|---|---|---|---|
| 5,394,268 | A | * | 2/1995 | Lanni | G02B 21/06 |
| | | | | | 359/368 |
| 5,532,873 | A | * | 7/1996 | Dixon | G02B 21/0068 |
| | | | | | 359/368 |
| 5,691,839 | A | * | 11/1997 | Kobayashi | G02B 21/0068 |
| | | | | | 359/368 |
| 5,880,880 | A | * | 3/1999 | Anderson | G02B 21/0048 |
| | | | | | 359/368 |
| 6,720,547 | B1 | * | 4/2004 | Rajadhyaksha | G02B 21/36 |
| | | | | | 250/225 |
| 6,745,067 | B1 | * | 6/2004 | Zavislan | A61B 5/445 |
| | | | | | 600/476 |
| 7,139,122 | B1 | * | 11/2006 | Eastman | G02B 21/0068 |
| | | | | | 424/9.1 |
| 7,394,592 | B2 | * | 7/2008 | Fox | G02B 21/0048 |
| | | | | | 359/368 |
| 2004/0113059 | A1 | * | 6/2004 | Kawano | G02B 21/0048 |
| | | | | | 250/234 |
| 2013/0044370 | A1 | * | 2/2013 | Seyfried | G02B 21/0036 |
| | | | | | 359/385 |
| 2019/0324241 | A1 | * | 10/2019 | Xu | G02B 21/008 |
| 2022/0121022 | A1 | * | 4/2022 | Wang | G02B 21/082 |
| 2023/0129700 | A1 | * | 4/2023 | Zhang | G02B 21/0048 |
| | | | | | 356/301 |

FOREIGN PATENT DOCUMENTS

| | | | | | |
|---|---|---|---|---|---|
| WO | WO-2015152218 | A1 | * | 10/2015 | G03F 7/162 |
| WO | WO-2018186960 | A1 | * | 10/2018 | G01N 21/6458 |
| WO | WO-2020047660 | A1 | * | 3/2020 | A61B 5/0075 |
| WO | WO-2021097482 | A1 | * | 5/2021 | G02B 21/002 |

OTHER PUBLICATIONS

Charles A. DiMarzio, Three-dimensional Multi-Modal Microscopy, 2009, pp. 1-4 [online], [retrieved Feb. 12, 2025], retrieved from the Internet <URL: https://ieeexplore.ieee.org/stamp/stamp.jsp?tp=&arnumber=4906692>. (Year: 2009).*

Peng Xi et al., Scanning and Imaging Reconstruction Techniques in Confocal Laser Scanning Microscopy, 2011, pp. 523-542 [online], [retrieved Feb. 12, 2025], retrieved from Internet <URL: https://www.researchgate.net/profile/Peng-Xi-5/publication/221912596_Scanning_and_Image_Reconstruction_Techniques . . . >. (Year: 2011).*

Virgil-Florin Duma et al., Polygon Mirror Scanners in Biomedical Imaging: A Review, 8621 Proceedings of SPIE 86210V-1 to 86210V-9 (2013). (Year: 2013).*

Y. X. Li et al., Flexible Polygon-mirror Based Laser Scanning Microscope Platform for Multiphoton in-vivo Imaging, 10 Journal of Biophotonics 1526-1537 (2017). (Year: 2017).*

Galvanometer Scanners, 2021, pp. 1-17 [online], [retrieved Feb. 14, 2025], retrieved from the Internet <URL: https://web.archive.org/web/20210624112851/https://www.scanlab.de/en/service/glossary/galvanometer-scanners>. (Year: 2021).*

Boultier et al., High-speed Two-photon Laser Scanning Microscopy Imaging of in vivo Blood Cells in Rapid Circulation at Velocities of Up to 1.2 Millimeters per Second. Current Optics and Photonics, vol. 2, No. 6, Dec. 2018 pp. 595-605.

Jianian Lin, et al: "Optical gearbox enabled versatile multiscale high-throughput multiphoton functional imaging". Nature Communications, Published online: Nov. 2, 2022; 9 pages.

Guanghan Meng, et al; "Ultrafast two-photon fluorescence imaging of cerebral blood circulation in the mouse brain in vivo". Neuroscience Biophysics and Computational Biology, Published Jun. 1, 2022; 11 pages.

* cited by examiner

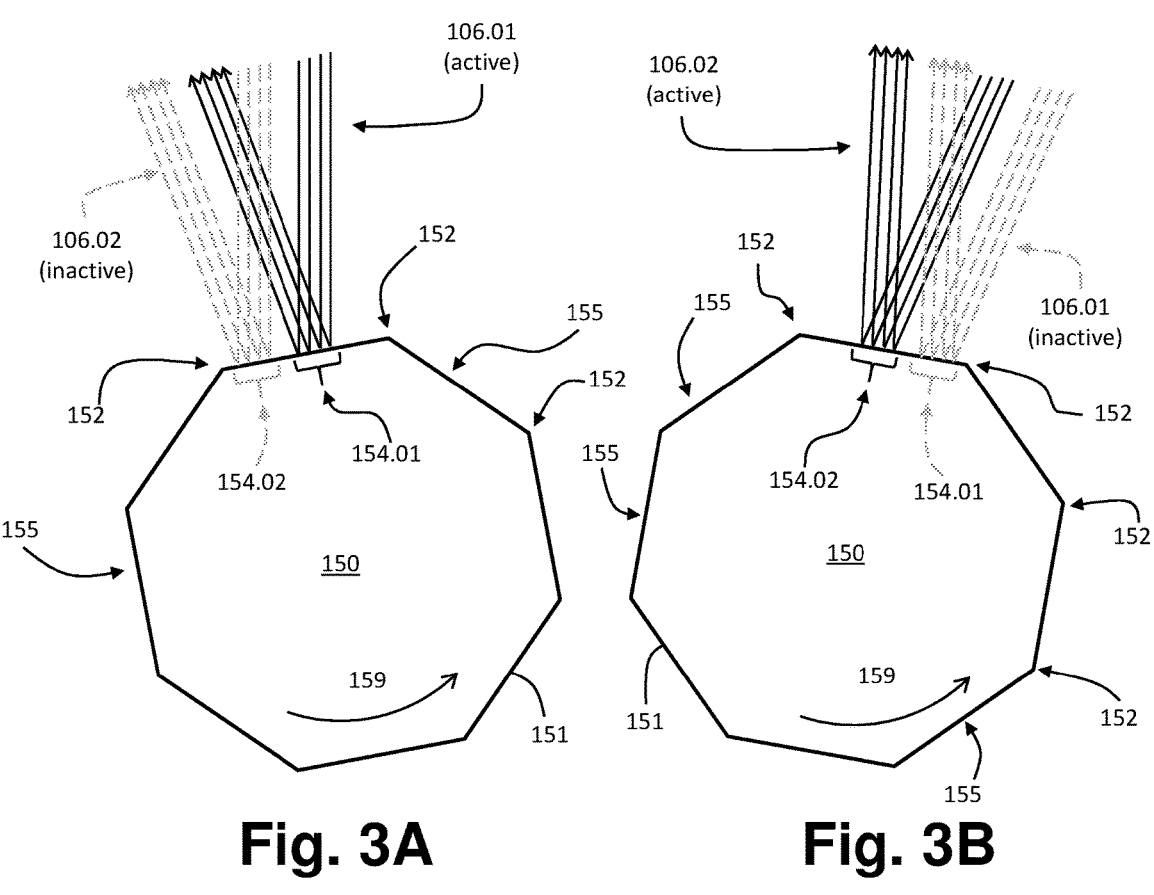
Fig. 3A                    Fig. 3B
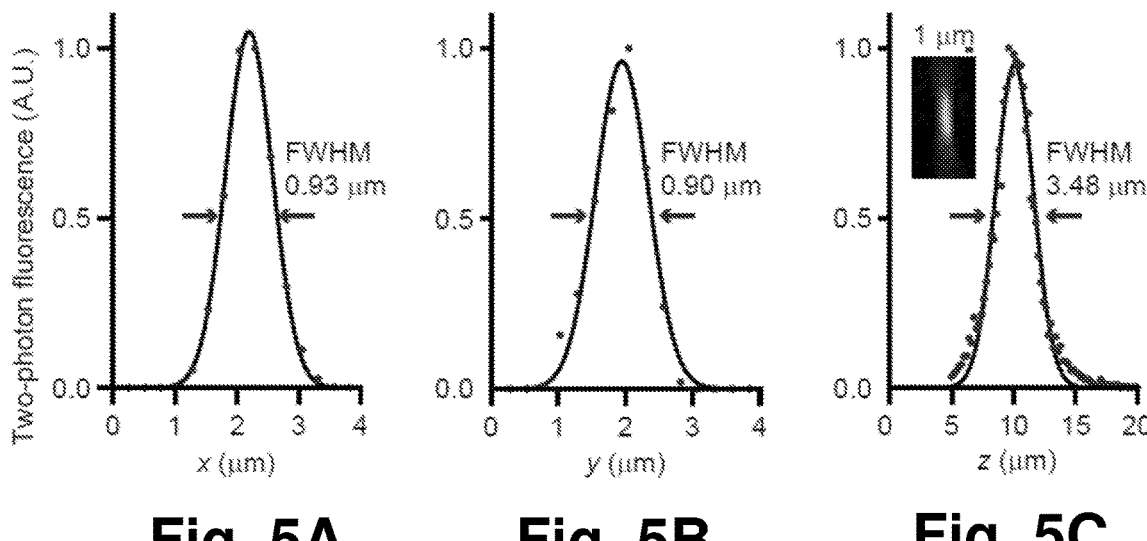
Fig. 5A              Fig. 5B              Fig. 5C

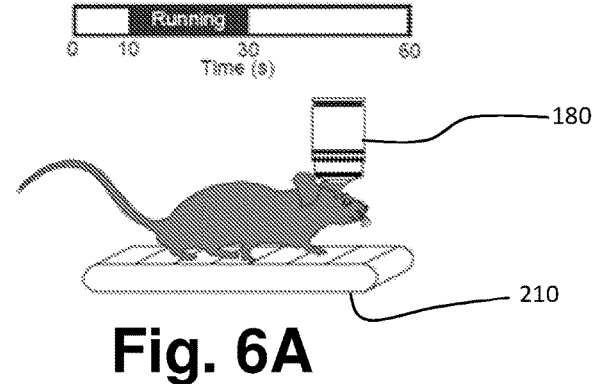
Fig. 6A
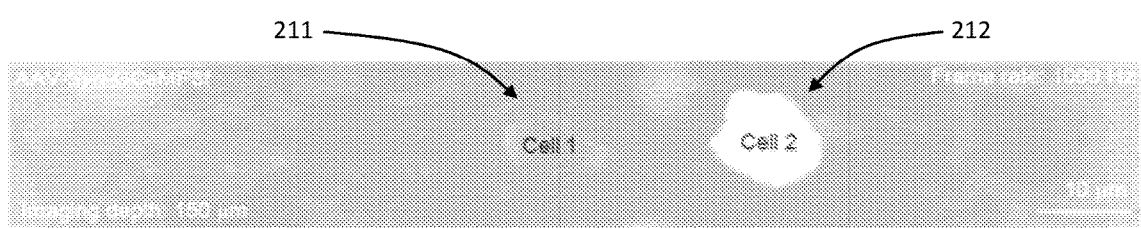
Fig. 6B
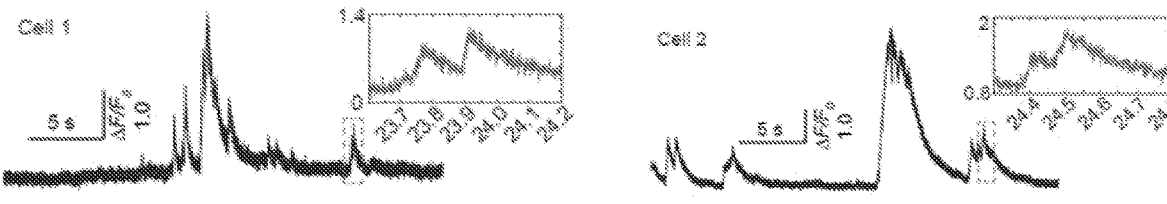
Fig. 6C　　　　　　　　　　　Fig. 6D

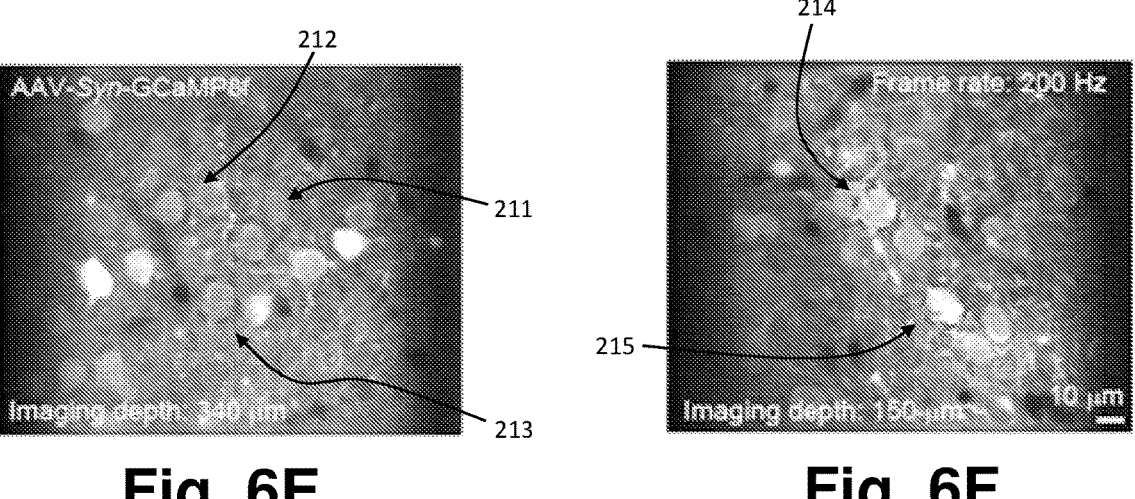
Fig. 6E                    Fig. 6F
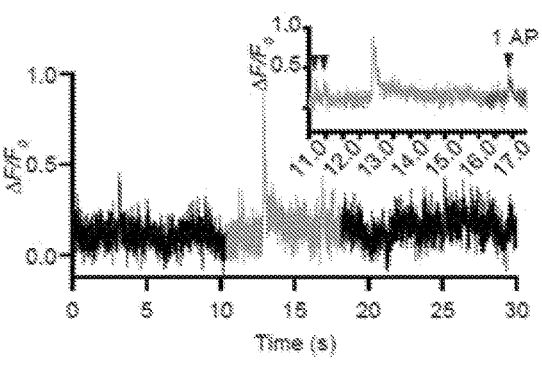
Fig. 6G
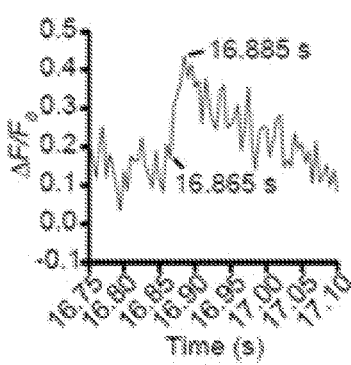
Fig. 6H

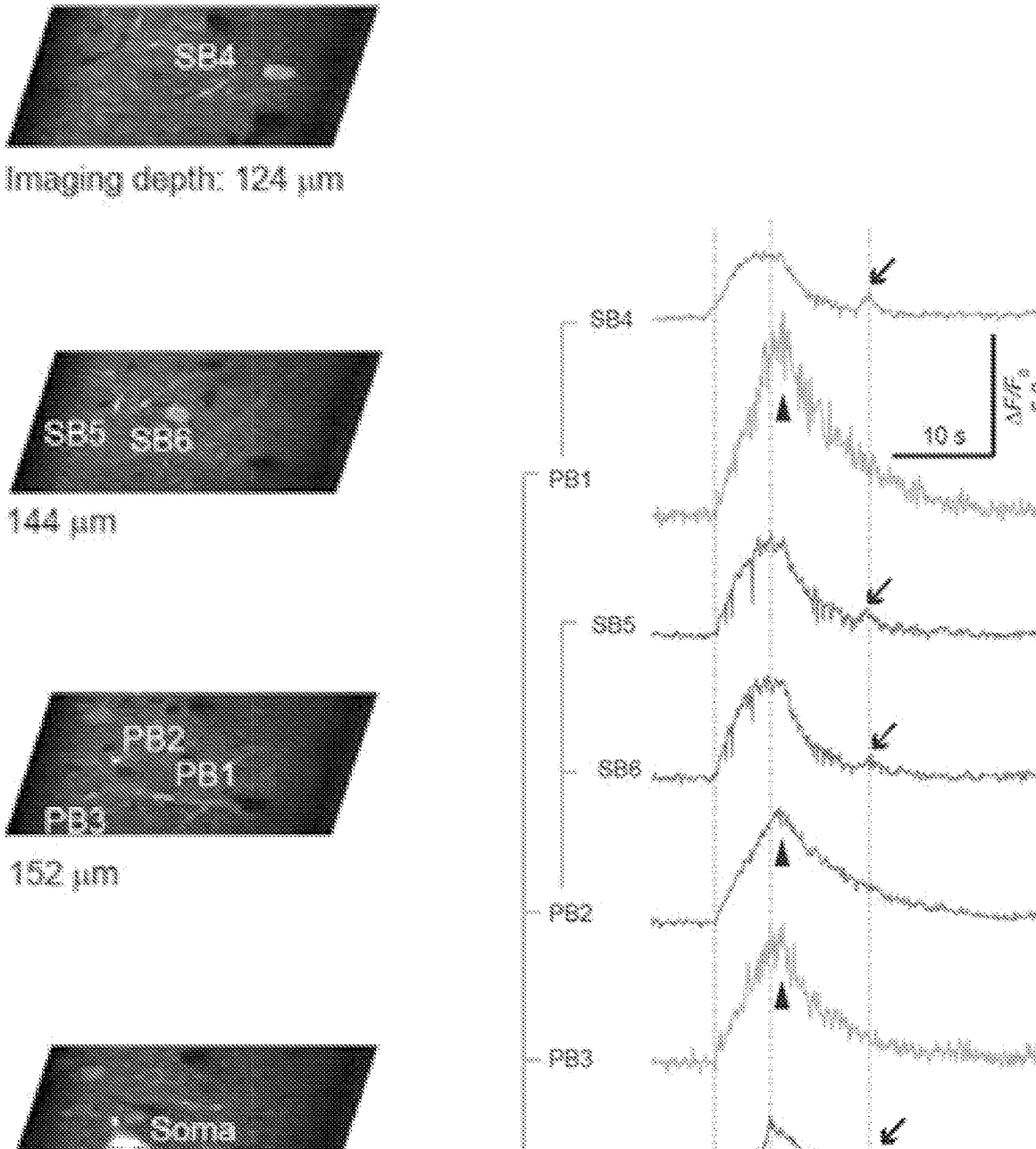
Fig. 7C          Fig. 7D

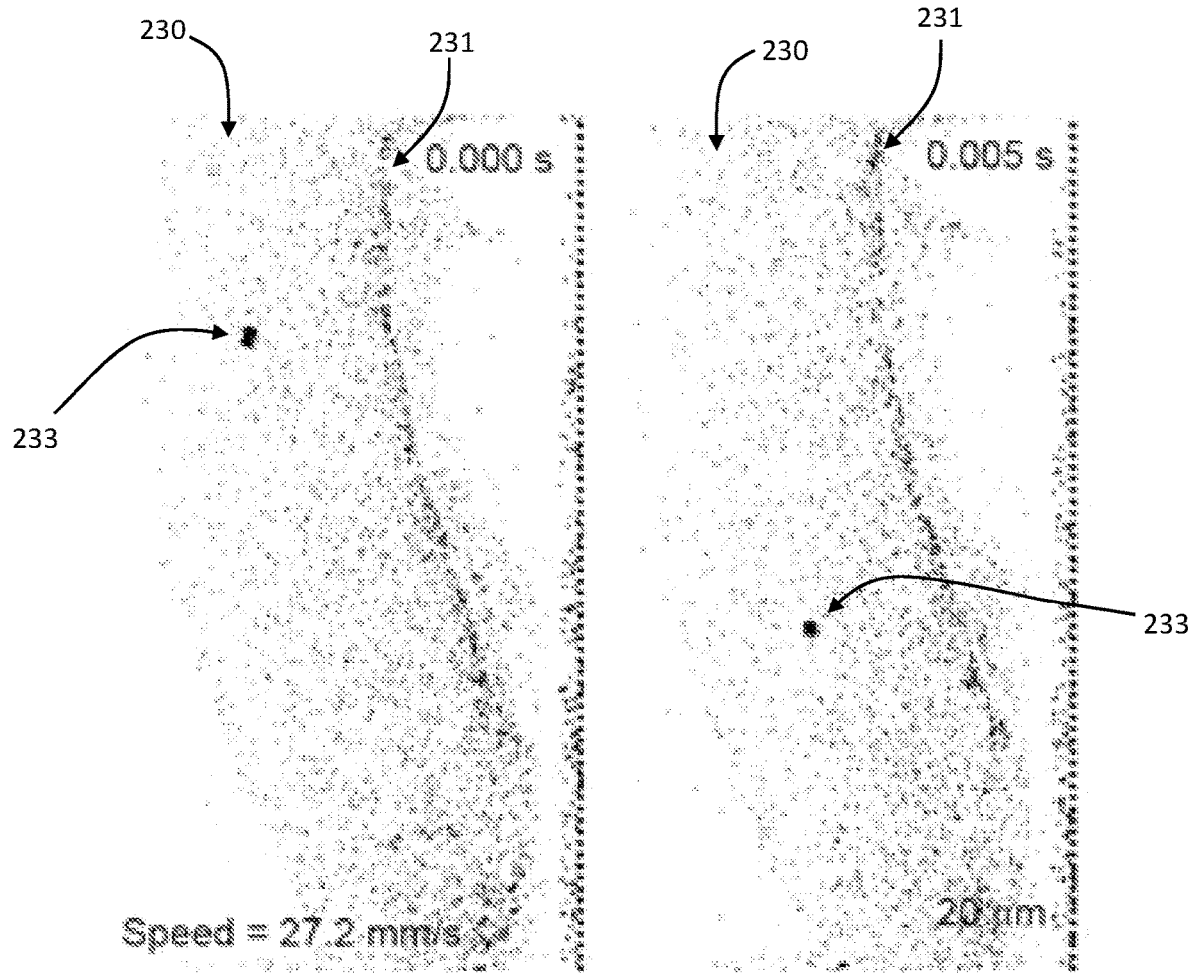
Fig. 8C          Fig. 8D

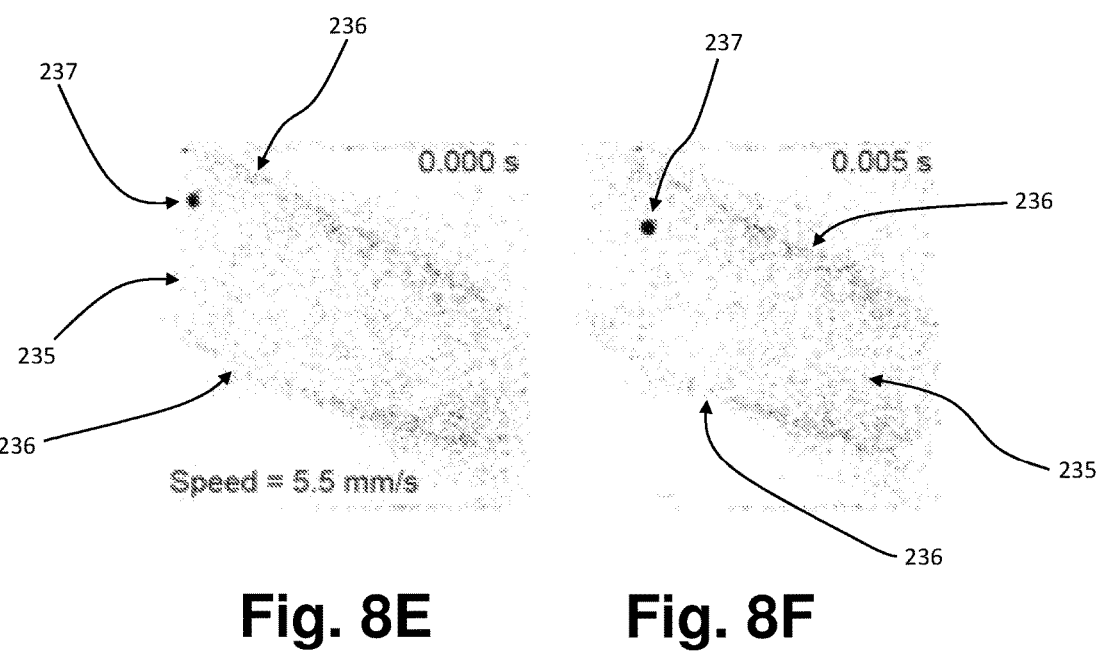
Fig. 8E          Fig. 8F
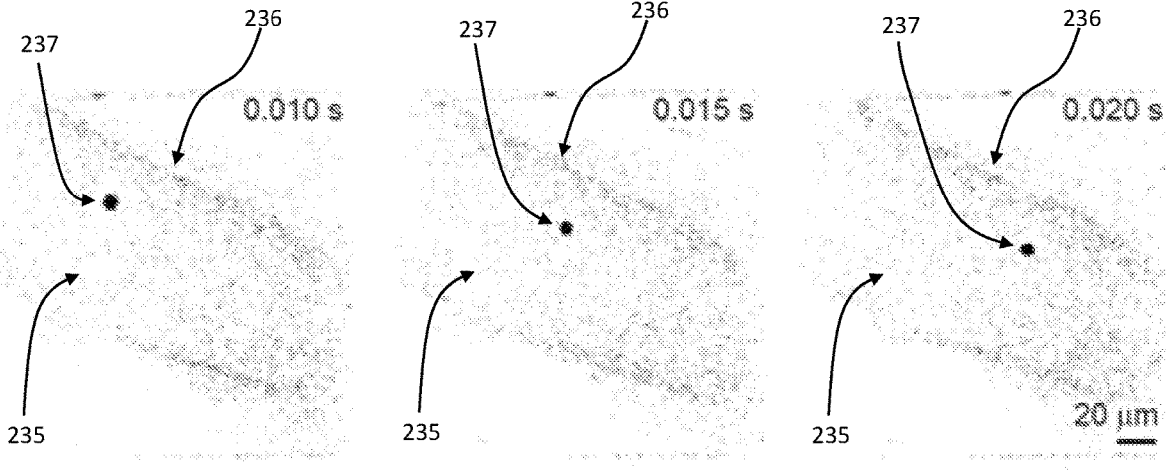
Fig. 8G          Fig. 8H          Fig. 8I

Left whisker shaking

APPARATUSES AND METHODS FOR HIGH-SPEED LASER SCANNING

This application claims the benefit of U.S. Provisional Application No. 63/268,265, filed Feb. 18, 2022, the entirety of which is hereby incorporated herein by reference.

GOVERNMENT RIGHTS

This invention was made with government support under contract numbers NS094341, NS107689, NS118302, NS118330, and EY032382 awarded by the National Institutes of Health. The government has certain rights in the invention.

FIELD

Embodiments of this disclosure relate generally to a systems and methods for high-speed laser scanning, such as high speed laser scanning microscopy.

BACKGROUND

Laser scanning can be used to generate images of objects, which can include large or small (for example, microscopic) objects. Two dominant types of laser scanners are resonant galvanometer scanners and polygon scanners, and laser scanners typically achieve high scan throughput at large angular scan ranges.

However, it was realized by the inventor of the present disclosure that problems exist with laser scanners and that improvements in laser scanners are needed. For example, the resonant frequency of resonant galvanometer scanners is fixed and the scan throughput reaches a maximum while scanning over the full range of the galvanometer. The driving force is generally proportional to the square of the oscillation frequency and linearly proportional to the oscillation amplitude; however, the scanning throughput is proportional to the product of the oscillation frequency and the amplitude. As such, the higher frequency resonant galvanometer scanner designs will inevitably suffer from reduced data throughput.

Polygon scanners use a rotating reflector with multiple sides, each side being a reflector, and may be used in various devices including, for example, microscopes, printers, manufacturing machinery, and LIDAR devices. In these scanners a laser beam is reflected off of the sides of the rotating polygonal cylinder. Because the laser beam inevitably scans across the discontinuous edge between the facets of the polygon, polygon scanners typically have a duty cycle of approximately 60%-70%, which means that polygon scanners are actively scanning and/or imaging 60%-70% of the time. It was realized by the inventor of the present disclosure that improvements in polygon scanners, such as improvements in the duty cycle of polygon scanners, can be achieved. For polygon scanners, the number of flat surface facets on the polygon mirror can be increased by using higher order polygons (for example, a hexagonal polygon mirror has six flat surface facets while an octagonal polygon mirror has eight flat surface facets) and a greater number of facets linearly increases the line scan rate for a set rotation speed. However, the more facets there are on a polygon scanner, the smaller the size of the facet will be. Moreover, reducing facet dimensions linearly decreases the angular resolution, thereby reducing the overall scanning throughput. With these factors considered, polygon scanners can only achieve higher line rate scanning at the cost of the overall data throughput.

Certain preferred features of the present disclosure address these and other needs and provide other important advantages.

SUMMARY

Embodiments of the present disclosure provide improved apparatuses and methods for high-speed laser scanning.

Further embodiments provide improved polygon scanners with increased duty rates, including duty rates approaching, and as high as, 100%.

It was realized by the inventor of the present disclosure that all laser scanners suffer from the reduced data throughput during high line rate scanning.

At least one embodiments of the present disclosure provides systems and methods that can flexibly change the line rate of a laser scanner, such as a polygon scanner, without sacrificing overall data throughput. Using embodiments of the present disclosure, a user can choose the scanner with the highest overall data throughput while flexibly changing its line rate based on the application. This may be thought of as being analogous to how the mechanical transmission system in a car can flexibly provide either high torque or high speed while the engine running at the same RPM.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIGS. 3A and 3B are schematic representations depicting different laser pathway groups that alternately impinge upon the polygon scanner depicted in FIG. 1 according to embodiments of the present disclosure.

FIGS. 5A-5C are a cross-sectional plots resulting from the imaging of 1 micron diameter fluorescence beads depicted in FIG. 4.

FIGS. 6A-6L depict high-speed 2D imaging and data production of neuronal activity in a test subject utilizing the system of FIG. 1 according to embodiments of the present disclosure.

FIGS. 7A-7D depict 3D volumetric imaging and data produced by translation of the objective lens of the systems of FIG. 1 according to embodiments of the present disclosure.

FIGS. 8A-8L are depictions of images produced and data acquired using the systems of FIG. 1 for in vivo flow cytometry according to embodiments of the present disclosure.

DETAILED DESCRIPTION OF THE ILLUSTRATED EMBODIMENTS

Figure 1:
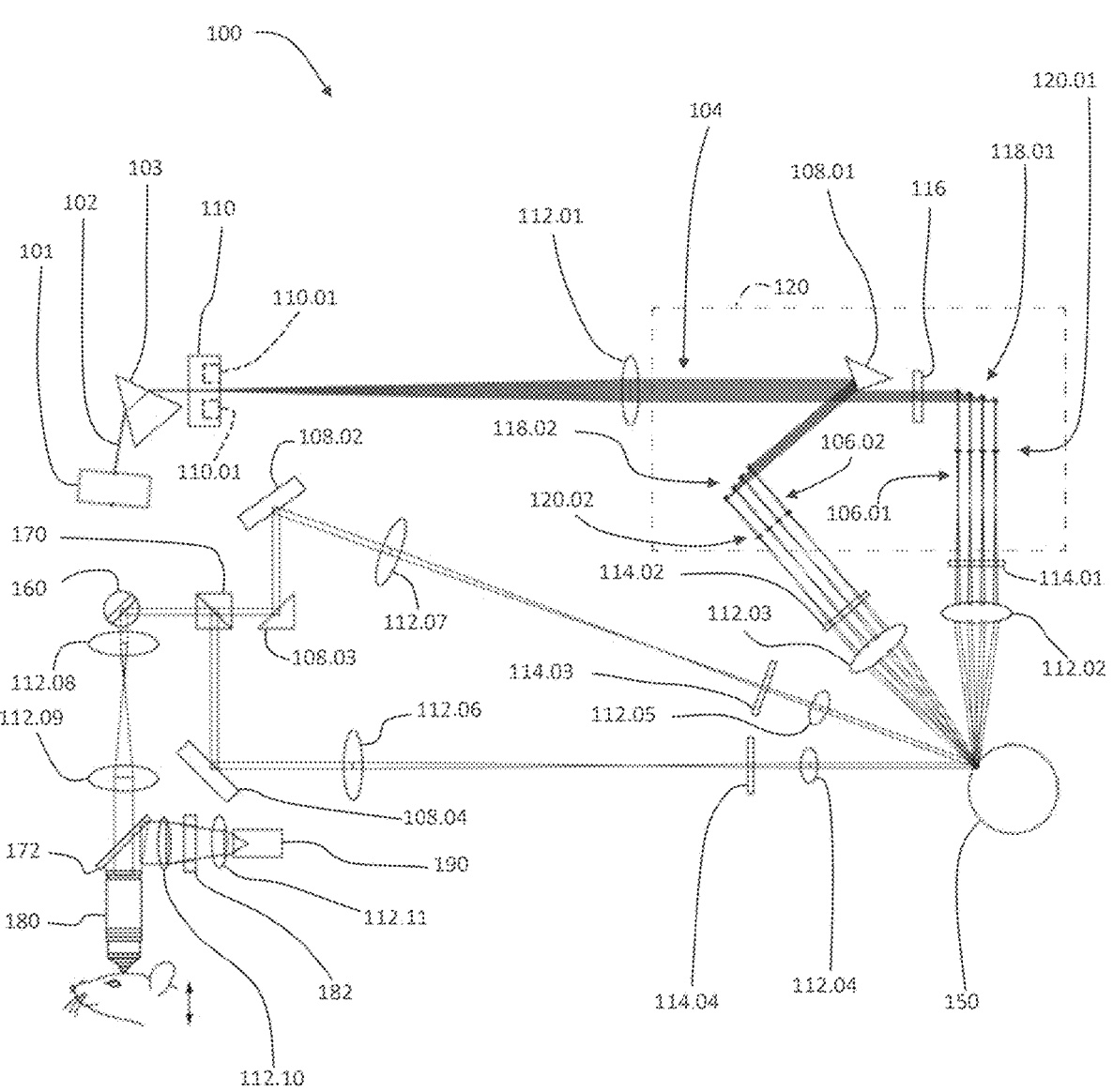
FIG. 1 is an illustration of a polygon-based optical gearbox system for laser scanning microscopy according to at least one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure provide systems and methods that improve the scanning speed of laser scanners (such as those used in imaging, including microscopic imaging) without loss of scanning throughput. One of the difficulties in using polygon scanners is that the scanning duty cycle is not 100% as the laser beam will inevitably travel across a discontinuous boundary between adjacent facets during which time the laser beam will be damaged. In addition, trying to increase the scanning line rate of the polygon scanner by increasing its number of facets of the polygon (for example, using an octagonal instead of a hexagonal polygon) will reduce the polygon scanner's overall scanning throughput. Embodiments disclosed herein can achieve 100% duty cycle and can flexibly increase the scanning line rate without any loss of the overall scanning throughput.

In order to address this and other problems, embodiments of the present disclosure utilize a multi-path scanning approach that switches beam paths to maintain continuous illumination of at least one facet and dramatically improves the duty cycle, in some embodiments achieving 100% imaging duty cycle.

Figure 2:
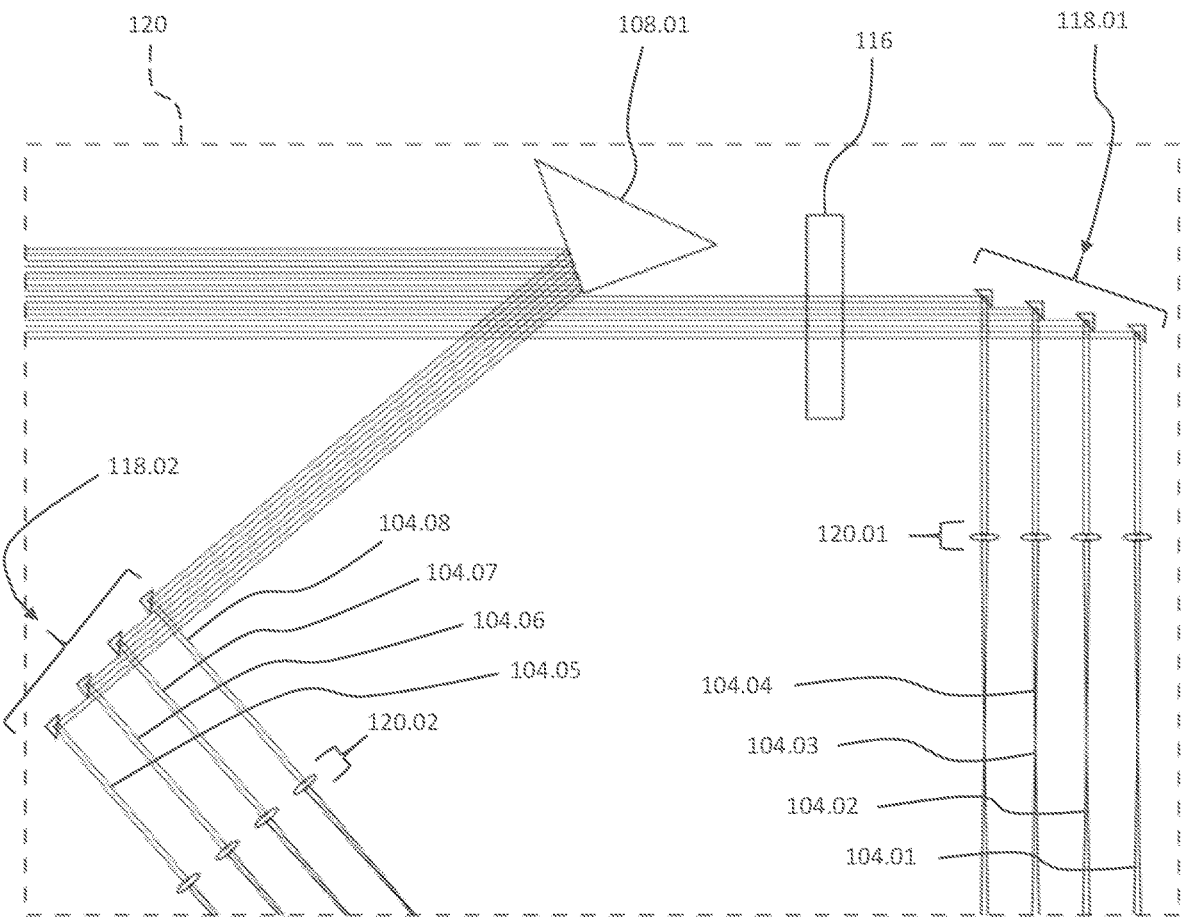
FIG. 2 is a fragmentary view of the dashed-line area in FIG. 1 depicting a close up view of micro prism mirrors and lenses.

Embodiments of the present disclosure include laser scanning systems (such as multi-path scanning systems), one example being a polygon-based optical gearbox system 100 as depicted in FIGS. 1 and 2. Optical gearbox laser scanning system 100 may be useful for laser scanning microscopy with a 100% duty cycle according to at least one embodiment of the present disclosure. The laser scanning system 100 includes one or more of the following: a prism (for example, prism 103), a device that rapidly switches the laser beam between two or more pathways 104 (for example, an acoustic optical deflector (AOD) 110), lenses (which may be one or more types of lenses, such as telecentric lenses (for example, telecentric lenses 112.01-112.11) and cylindrical lenses (for example, cylindrical lenses 114.01-114.04)), mirrors (for example, mirrors 114.01-114.04), half-wave plates (for example, half-wave plate 116), mirror arrays (for example, miniature mirror arrays 118.01 and 118.02), lens arrays (for example, miniature lens arrays 120.01 and 120.02), beam splitters (for example, a polarizing beam splitter 170 and/or a dichroic beam splitter 172), objective lenses (for example, objective lens (OBJ) 180), and/or optical filters (for example, optical filter 182).

After leaving the laser beam 102, the laser beam 102 encounters a switching device that rapidly switches the laser beam 102 between two or more pathways 104, such as acoustic optical deflector (AOD) 110. Prior to reaching the AOD 110, the laser beam may pass through an optional prism 103 (for example, a Brewster optical prism), which can help compensate for a spatial chirp associated with some acoustic optical deflectors. In the depicted embodiment the laser beam 102 is rapidly switched between eight (8) different pathways 104. See, for example, FIGS. 1 and 2 depicting eight (8) separate light pathways 104. The AOD 110 can change the direction of the laser beam 102 very quickly (for example, as fast as one microsecond (1 μs)), with the angular difference between each of the different directions/pathways typically being small, for example, on the order of a few optical modes, which in at least one example embodiment is approximately $\frac{1}{1000}$ radians (approximately 0.06 degrees). In at least one optional embodiment (depicted using broken lines in FIG. 1), a laser beam sequencer 110.01 and a laser beam splitter 110.02 are combined in AOD 110.

Once the laser beam 102 is separated into multiple pathways 104, the beams traveling in the different pathways 104 are directed to a polygon scanner 150 from different directions. For example, in the embodiment depicted in FIGS. 1 and 2 the separated beams are separated into two groups of laser beams 106.01 and 106.02, each group including one or more beams, and these groups of beams approach the surface of the polygon scanner 150 from different directions. It is noted that each group of separated beams does not have the separated laser beams traveling simultaneously along each of the pathways 104 in each group, but instead has each of the separate laser beams traveling sequentially along each of the pathways 104. In other words, because of the switching occurring at the AOD 110, a laser beam will travel along a first pathway until the AOD 110 switches to a second pathway (at which time a laser beam will travel along the second pathway and there will no longer be a laser beam traveling along the first pathway), and a laser beam will travel along the second pathway until the AOD 110 switches to a third pathway (at which time a laser beam will travel along the third pathway and there will no longer be a laser beam traveling along the first or second pathways). In the example illustrated in FIGS. 1 and 2 with eight (8) separate pathways 104, this process will continue until a laser beam has been sequenced between the eight (8) pathways 104.

As the laser pathways 104 emanate from the AOD 110 they are directed to the rotating polygon scanner 150 so that they intersect with the scanner 150 at two different locations (e.g., incident beam locations 154.01 and 154.02 as depicted in FIG. 3). For example, the laser pathways 104 may be divided into at least two groups 106 of laser beam pathways 104. As in the example depicted in FIGS. 1 and 2, one of the laser beam groups (for example, laser beam group 106.02) may be reflected (such as by reflecting off a mirror 108.01) while the other laser beam group (laser beam group 106.01) may not be reflected so that it continues along its pathway past the location where the reflected laser beam group is reflected. Each group of laser beam groups 106.01 and 106.02 may then then be directed toward the polygon scanner 150. In one example embodiment, one or more of the laser beam groups 106.01 and 106.02 are optionally directed toward the polygon scanner 150 using one or more miniature mirror arrays (for example, miniature mirror arrays 118.01 and 118.02). Each of the miniature mirrors in each miniature mirror array reflects one of the laser beams that are traveling along their separate laser beam pathways 104.

The beams that continue past mirror 108.01 without being reflected by mirror 108.01 can optionally pass through a half-wave plate 116, which can change the polarization orientation of the beams that continue past mirror 108.01 facilitating the ability to recombine these beams (the beams in laser beam group 106.01) with the beams reflected by mirror 108.01 (the beams in laser beam group 106.02) at a later point, such as by recombining the two groups of beams 106.01 and 106.02 with a beam splitter (for example, polarizing beam splitter 170) farther down the laser pathway.

Since the angular separation of the laser pathways 104 after the AOD 110 can be very small as described above, a spatial mode spacing amplification can be used to further separate the laser pathways 104. In at least one example embodiment, the spatial mode spacing amplification can be accomplished using multiple micro lenses, for example, with each laser pathway passing through a micro lens. The micro lenses can be positioned in an array (such as micro lens arrays 120.01 and 120.02) and can dramatically increase the spatial mode spacing between adjacent beams, such as to separate the spacing to be on the order of hundreds of optical modes, which in at least one example embodiment is approximately ¹⁄₁₀ radians (approximately 6 degrees). Spatial mode spacing amplification can be very beneficial in combining the advantages of the high temporal response of AOD 110 and the large angular scan range of a polygon scanner, which can separate the laser beam path with large spacing at high speed.

The two pathway groups (for example, pathway groups 106.01 and 106.02) are incident on the polygon scanner 150 at two different locations, for example, at incident beam locations 154.01 and 154.02 as depicted in FIG. 3.

Polygon scanners can exhibit orientation instability, which can be particularly pronounced in the direction perpendicular to the mirror scanning direction, in other words, instability in the direction perpendicular to the plane of spinning/scanning of the polygonal scanner 150. Cylindrical lenses (for example, 114.01 and/or 114.02) are used in some embodiments to focus the laser spots of the laser pathways 104 into lines on the polygon mirror surface 151 to help mitigate the impact of this type of instability. Referring to FIG. 1, in some embodiments the laser pathways 104 are focused into lines that are oriented in a plane parallel to the plane of spinning/scanning of the polygonal scanner 150. The lines may then be converted back to round laser spots by optional cylindrical lenses (for example, 114.03 and/or 114.04) positioned in the laser pathways 104 downstream of the polygonal scanner 150.

Depicted in FIGS. 3A and 3B is a schematic representation of an example polygon reflector 150 representing the ability of embodiments of the present disclosure to alternate between at least two laser pathway groups (for example, laser pathway groups 106.01 and 106.02) to achieve a 100% imaging duty cycle with the imaging being uninterrupted by the edges 152 of the polygon scanner 150. Synchronizing the rotation of the polygon scanner 150 and the activation of the laser pathway groups 106.01 and 106.02 permits the activation and deactivation of the laser beam pathways 104 in groups 106.01 and 106.02 so that the active group is incident on the polygon scanner 150 in a central location 155 and away from polygon edges 152.

Using FIG. 3A as an example, the laser beam pathways 104 in pathway group 106.01 transmit laser light while the incident beam location 154.01 of pathway group 106.01 is in a central location 155 and away from the polygon edges 152. Turning to FIG. 3B, as the polygon scanner 150 rotates the incident beam location 154.01 of pathway group 106.01 approaches a polygon edge 152 and the laser beam pathways 104 in pathway group 106.01 are deactivated (in other words, the pathways 104 in pathway group 106.01 are turned off and no longer transmit laser light) and the laser beam pathways 104 in pathway group 106.02 are activated (in other words, the pathways 104 in pathway group 106.02 are turned on and transmit laser light) with the laser beam pathways 104 of pathway group 106.02 impacting the rotating polygon scanner 150 in a central location 155 that is away from the edges 152.

In this way the polygon scanner 150, which rotates continually, and the AOD 110 are synchronized and the system 100 alternates between the two separate groups of active laser beam groups (laser pathway groups 106.01 and 106.02) so that the group being used (the group of laser beam pathways 104 currently being illuminated with laser light) is the group in which the pathways 104 intersect the rotating polygon scanner 150 at a location that is away from an edge 152 of the polygon. The system 100 switches laser pathway groups 106.01 and 106.02 on and off so that the active group of laser pathways is in the central portion 155 of a side/facet and not near one of the edges/angles 152 where the reflective surface is no longer predictable, for example, where the reflective surface is no longer planar. In some embodiments the laser pathway groups 106.01 and 106.02 are switched on and off so that the active group of laser pathways are no closer to the beginning of the edge/ angle 152 (the point where the reflective surface is no longer predictable/planar) than one radius of curvature between two the two adjacent facets.

Using the two laser pathway groups 106.01 and 106.02, the imaging can be performed so that the imaging process is not interrupted by the edges 152 of the polygon scanner 150, thereby increasing the duty cycle to above 90%, and in some embodiments to 100%. At any moment the polygon mirror edge 152 is located away from the incident laser beam and 100% imaging duty cycle can be achieved.

After being reflected off the rotating polygon scanner, the laser beam pathways 104 in laser beam pathway groups 106.01 and 106.02 are overlaid with one another so that all the laser beam pathways travel in the same general pathway. In one example this recombining of pathway groups 106.01 and 106.02 is accomplished with a beam splitter (for example, a polarizing beam splitter 170). Prior to being recombined, the groups of laser beam pathways may pass through one or more lenses (for example, telecentric lenses 112.04, 112.05, 112.06 and/or 112.07, and/or cylindrical lenses 114.03 and 114.04) and may be reflected by one or more mirrors (for example, mirrors 108.02, 108.03 and 108.04) before being recombined, such as by polarizing beam splitter 170.

The angle at which the laser beams in each of the individual laser beam pathways 104 (for example, the eight (8) pathways 104 that are depicted in FIGS. 1 and 2) are reflected changes as the polygon scanner rotates while each pathway is illuminated. In other words, as an individual pathway is illuminated, the laser beam reflected off the polygon scanner sweeps through an angle as the polygon scanner rotates. Because of this, the lenses immediately downstream of the polygon scanner (for example, lenses 112.04 and 112.05) are typically large enough to capture the entirety of each individual laser beam pathways 104 as the pathways 104 are swept by the rotating polygon scanner 150.

After being recombined, the laser beam can travel through a microscope in order to produce a desired image. In the embodiment depicted in FIG. 1, the microscope includes a galvanometer 160 (for example, a 2-axis galvanometer scanner), which can provide orthogonal scanning axes to perform 2D scanning, and can provide the flexibility to position the imaging area to multiple different user-defined locations on the test subject. The light departing the galvanometer 160 may be subsequently relayed through additional optical elements, such as lenses (for example, telecentric lenses 112.08 and 112.09) and/or a beam splitter (for example, dichroic beam splitter 172), before arriving at the pupil of an imaging objective lens 180.

After the light returns from the target sample (the returning light may be referred to as the excited optical signal) the returning light can reflect off a beam splitter 172 to be directed to an optical detector 190 (for example, a photomultiplier tube PMT or a silicon detector). After the beam splitter and prior to the optical detector, the light may pass through additional lenses (for example, signal collection lenses 112.10 and 112.11) and/or an optical filter (for example, optical filter 182). In some embodiments the objective lens 180 is mounted on a piezo stage which can move the objective lens 180 in the axial direction.

Figure 4:
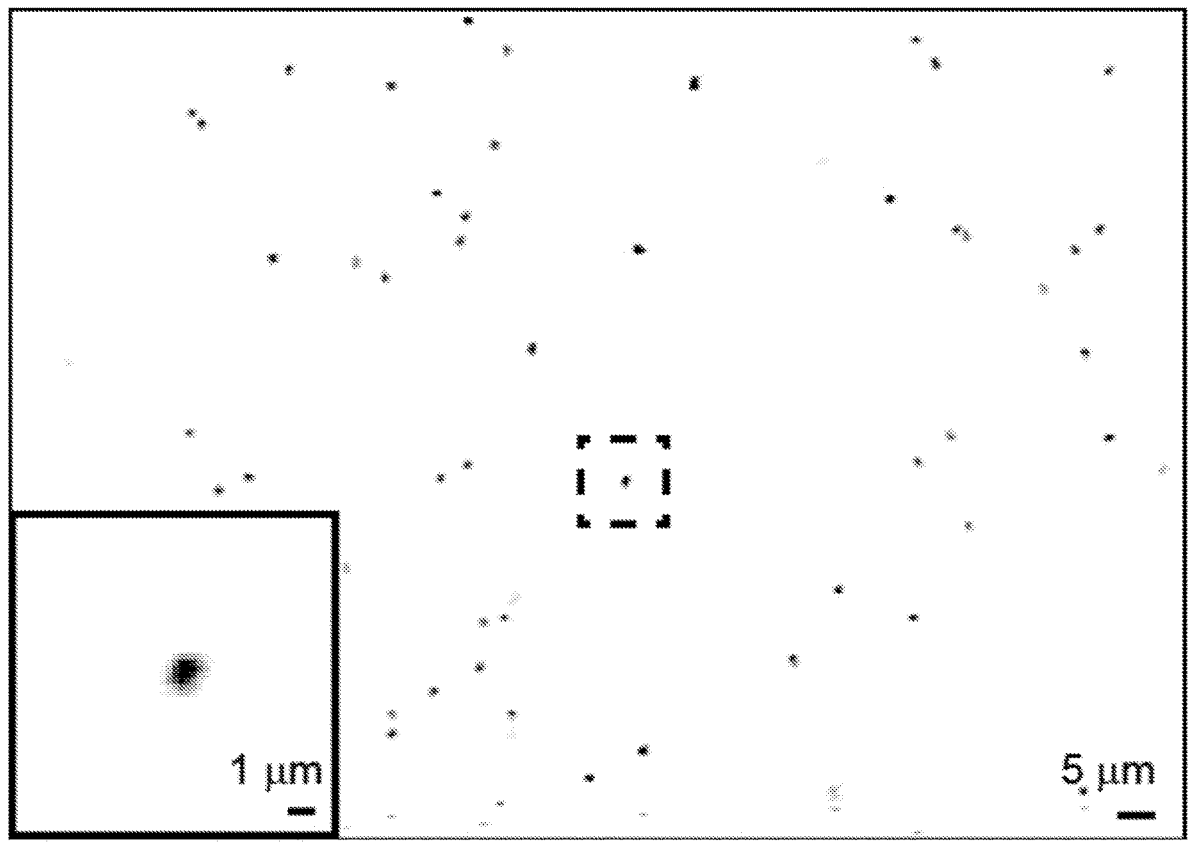
FIG. 4 is an image of 1 micron diameter fluorescence beads produced by the system 100 depicted in FIG. 1.

FIG. 4 depicts a sample with multiple florescence beads. Each fluorescent bead is approximately 1 micron in diameter as shown in the expanded image of the fluorescent bead depicted with the dashed lines.

FIGS. 5A, 5B and 5C depict cross-sectional plots of the focal profile using data obtained from imaging the 1 micron diameter fluorescence beads depicted in FIG. 4. FIG. 5A depicts the fluorescence (in arbitrary units) in the x-direction with the full width at half maximum (FWHM) depicted. FIG. 5B depicts the fluorescence (in arbitrary units) in the y-direction with the full width at half maximum (FWHM) depicted. FIG. 5C depicts the fluorescence (in arbitrary units) in the z-direction with the full width at half maximum (FWHM) depicted.

Figure 6I:
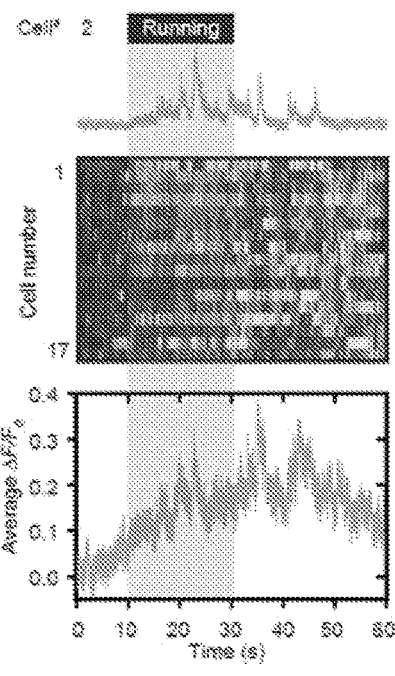

Depicted in FIGS. 6A-6L are images and plots produced using a multi-path scanning system (for example, system 100 depicted in FIGS. 1 and 2) to image neuronal activity in a subject animal running on a treadmill according to embodiments of the present disclosure. In these embodiments high-speed 2D imaging of fast biological cellular dynamics are performed. FIG. 6A depicts a subject mouse running on a linear treadmill 210 for 20 seconds with objective lens 180 of system 100 imaging the mouse's brain. Neurons in the mouse's neocortex were labeled with fast calcium indicators (GCaMP8f) and imaged over time while the mouse was running. From the high-quality imaging data the calcium signals from each of a number of different cells were able to be extracted and plotted as a function of time. FIG. 6B depicts two example cells 211 and 212 at an imaging depth of 150 $\mu$m and a frame rate of 1,000 Hz.

Embodiments of the present disclosure permit users the freedom to change the imaging frame rate without affecting the imaging throughput. As an example, the in vivo calcium imaging results for 1,000 Hz and 200 Hz frame rate are shown in FIG. 6C (cell 1) and 6D (cell 2). FIG. 6C depicts relative changes in fluorescence ($\Delta F/F_0$) during an approximate 30 second period with the data between approximately 23.6 and 24.2 seconds expanded. FIG. 6D depicts relative changes in fluorescence ($\Delta F/F_0$) during an approximate 30 second period with the data between approximately 24.3 and 24.8 seconds expanded. $F_0$ is the minimum 10% of each ROI's fluorescence signal.

If only one of the example eight laser pathways 104 is used, the line scan rate will not be increased, but there will still be the same large scanning range. Here, the scanning range may be considered to be analogous to an imaging field of view. However, if two of the example eight paths are used (for example, laser pathways 104.01 and 104.05, or 104.02 and 104.06), the line scan rate will be doubled and the scanning range will be halved. If four of the example eight paths are used (for example, pathways 104.01, 104.03, 104.05 and 104.07), the line scan rate will be quadrupled (4 times the scanning rate of the single pathway example) and the scanning range will be one-quarter ($\frac{1}{4}$) of the original scanning range. Finally, if all eight (8) pathways 104 are utilized (for example, pathways 104.01, 104.02, 104.03, 104.04, 104.05, 104.06 and 104.07), the line scan rate will be increased eight-fold (8 times the scanning rate of the single pathway example) and the scanning range will be one-eighth ($\frac{1}{8}$) of the original scanning range. Since the scanning throughput is the product of the line rate and the scanning range, it can be seen that the scanning throughput is the same in the preceding examples (the examples utilizing 1, 2, 4 and 8 laser pathways 104). As such, there is flexibility in selecting a scanning rate without any resultant loss of the overall scanning throughput.

FIG. 6E depicts an image of cells 211, 212 and 213, which appear at an imaging depth of 340 µm.

FIG. 6F depicts cells 214 and 215 at an imaging depth of 150 µm and a frame rate of 200 Hz, each figure having the same scale.

FIG. 6G depicts an example plot of the relative changes in fluorescence ($\Delta F/F_0$) for cell 211 during an approximate 30 second period with the data between 10 and 17 seconds expanded.

FIG. 6H depicts the relative changes in fluorescence ($\Delta F/F_0$) during the time period of approximately 16.75 to 17.10 seconds from FIG. 6G.

FIG. 6I depicts data obtained for cell 212 during a 60 second time period with the gray portion being the period during which the test subject was running. The top plot depicts the average $\Delta F/F_0$ (relative changes in fluorescence) over the 60 second time period, the middle plot depicts a heat map comparison of cell 212 to 16 other cells, and the bottom plot is an expanded view of the top plot.

Figure 6J:
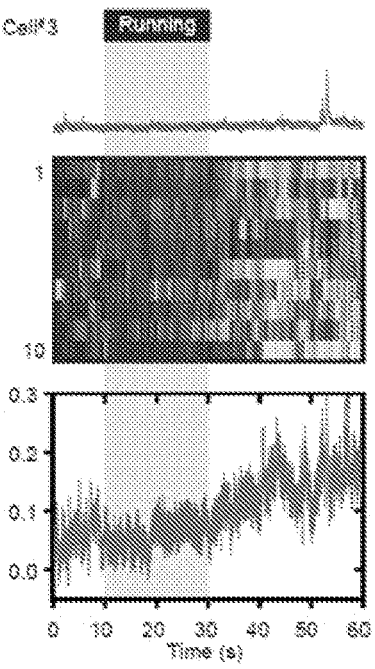

FIG. 6J depicts data obtained for cell 213 during a 60 second time period with the gray portion being the period during which the test subject was running. The top plot depicts the average $\Delta F/F_0$ (relative changes in fluorescence) over the 60 second time period, the middle plot depicts a heat map comparison of cell 213 to 9 other cells, and the bottom plot is an expanded view of the top plot.

Figure 6K:
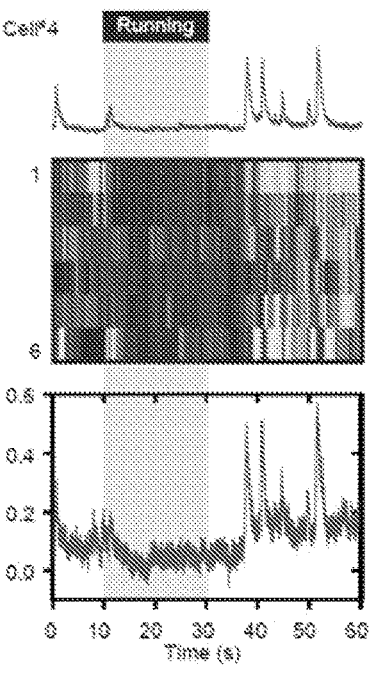

FIG. 6K depicts data obtained for cell 214 during a 60 second time period with the gray portion being the period during which the test subject was running. The top plot depicts the average $\Delta F/F_0$ (relative changes in fluorescence) over the 60 second time period, the middle plot depicts a heat map comparison of cell 214 to 5 other cells, and the bottom plot is an expanded view of the top plot.

Figure 6L:
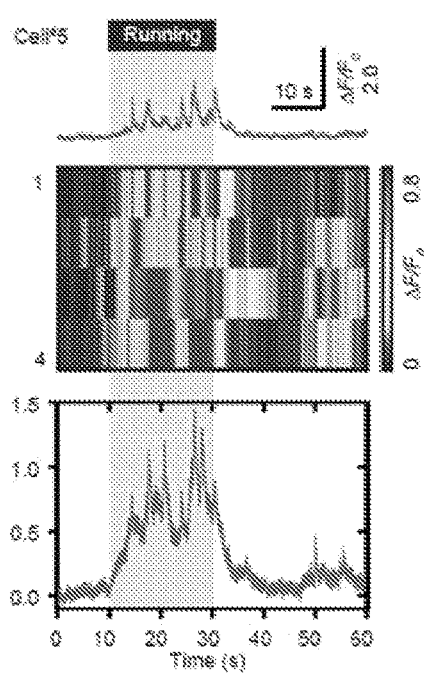

FIG. 6L depicts data obtained for cell 215 during a 60 second time period with the gray portion being the period during which the test subject was running. The top plot depicts the average $\Delta F/F_0$ (relative changes in fluorescence) over the 60 second time period, the middle plot depicts a heat map comparison of cell 215 to 3 other cells, and the bottom plot is an expanded view of the top plot.

Shown in FIGS. 7A-7D are depictions of an example system and method for producing a 3D volumetric image according to at least one embodiment of the present disclosure where the 2D images were spread over a 3D volume.

Figure 7A:
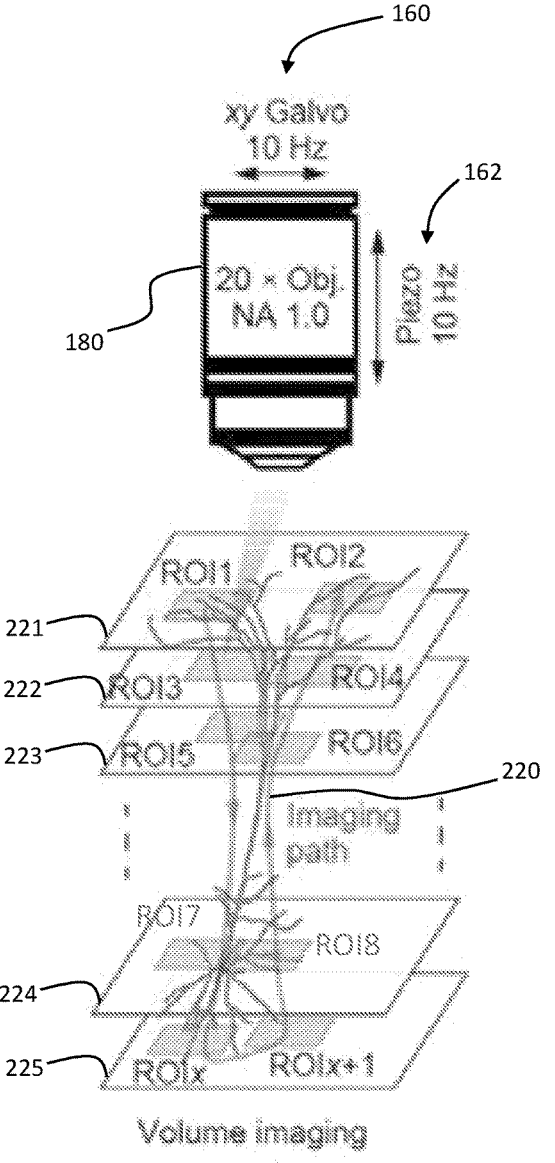

FIG. 7A depicts an example embodiment in which the piezo stage 162 connected to the objective lens 180 moved the objective lens 180 vertically at a 10 Hz rate while the xy galvanometer 160 connected to the objective lens 180 moved the objective lens 180 horizontally at a 10 Hz rate, thereby recording the cellular dynamics over three dimensions at a 10 Hz volume rate. During the 10 Hz volume scanning, the 2-axis galvanometer scanner can be controlled such that at each depth the system 100 obtains an image at the desired region of interest (ROI).

FIG. 7A also depicts an example imaging pathway 220 (the center of the areas being imaged) as the system 100 sequentially obtains images at ROI1 (imaging layer 221), ROI3 (imaging layer 222), ROI5 (imaging layer 223), ROI7 (imaging layer 224), ROIx (imaging layer 225), ROIx+1 (imaging layer 225), ROI8 (imaging layer 224), ROI6 (imaging layer 223), ROI4 (imaging layer 222), and ROI2 (imaging layer 221). It is noted that in FIG. 7B each ROI is at a different location in the target sample, demonstrating the ability of system 100 to obtain images at various horizontal locations and vertical depths. Of course, the pathway depicted in FIG. 7B is merely an example with the objective lens 180 being capable of following virtually an infinite number of imaging pathways 220.

The regions of interest as presented in 3D (see, FIG. 7C) can be selected by, for example, using a graphical user interface. Based on this selection the piezo scanning path and the 2-axis galvanometer scanner driving voltages can be used to create the time-lapse volumetric recording.

Figure 7B:
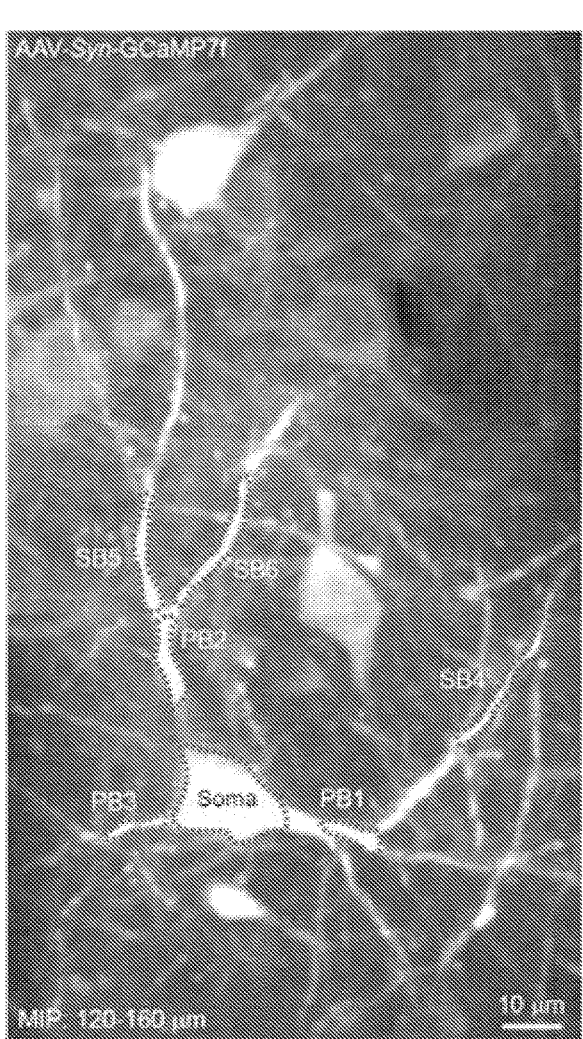

FIG. 7B depicts an example 3D image produced by the translation of the objective lens 180 to form a 3D volumetric image recording of cellular structures according to at least one embodiment of the present disclosure. To obtain the image in FIG. 7B, 200 Hz to 1,000 Hz imaging frames were obtained at different depths (in other words, spread to three dimensions) in order to produce the 3D volumetric recording of cellular dynamics in a live animal. For example, in FIG. 7A each example ROI is depicted as a square gray region (depicted as a gray trapezoid in the plane of the image, which is intended to represent a gray square in three dimensions) at each imaging layer.

From the 3D images the calcium transients from the soma, primary and secondary dendritic branches, were extracted, which incidentally revealed distinct temporal dynamics. In some cases the calcium transients in the secondary branches preceded the somatic signals, and the calcium decay was prolonged in secondary branches, likely due to the back propagating action potential, creating the triangular arrowheads in FIG. 7D. in another case the calcium transient could be observed simultaneously from the soma and the secondary dendritic branches, but could not be observed from the primary branches, likely due to the negative regulation in the primary branch, as shown by the arrows in FIG. 7D. Such observations highlight the usefulness of 3D volumetric recording and demonstrated the versatility of embodiments disclosed herein.

In one example embodiment (which produced the results represented by FIGS. 7A, 7C and 7D) the calcium signal propagation on the dendritic branches of the neurons were recorded and distinct responses from the soma, primary branches (PB1, PB2 and PB3), and secondary branches (SB4, SB5 and SB6) were imaged. FIG. 7B is a reproduction of the composite 3D image. FIG. 7C depicts images of the primary branches, secondary branches, and soma obtained at different imaging depths (124 µm, 144 µm, 152 µm and 160 µm).

Figure 8A:
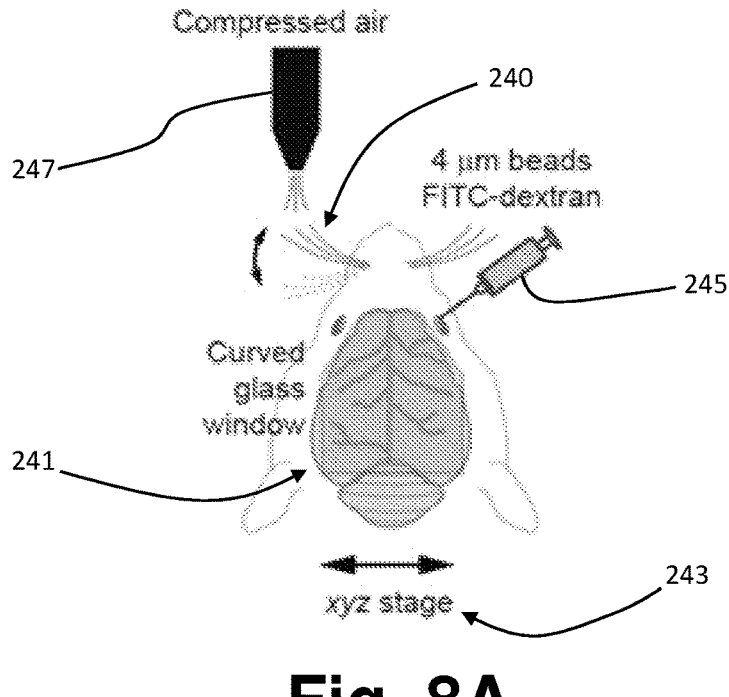
Figure 8B:
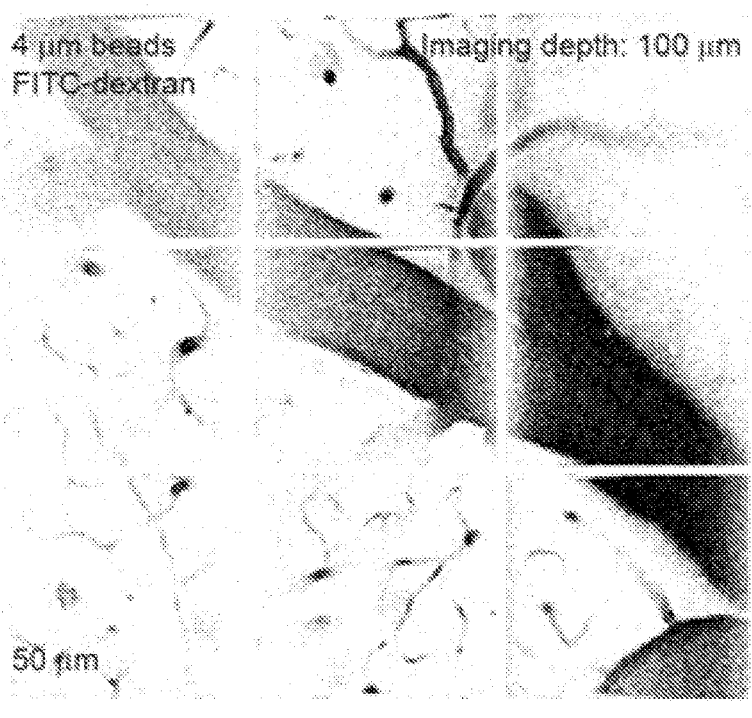

Using embodiments of the present disclosure, in vivo flow cytometry can be enabled. For example, FIGS. 8A-8L are depictions of example systems and methods for producing images of blood vessels, which can be useful for evaluating characteristics of the blood vessels. FIG. 8A depicts the test subject with whisker 240, a curved glass window 241, a 3-dimensional piezo stage 243, a device for delivering a tracing element (for example, a syringe 245 for delivering a fluorophore blood tracing particle 233/237), and a stimulator (for example, an air nozzle 247) for moving the whisker 240.

FIGS. 8C and 8D depict a fluorophore blood tracing particle 233 traveling through a blood vessel 230 with a blood vessel wall 231 produced by embodiments of the present disclosure. FIGS. 8E, 8F, 8G, 8H and 8I depict a fluorophore blood tracing particle 237 traveling through a blood vessel 235 with a blood vessel wall 236 also produced by embodiments of the present disclosure. By depicting the blood tracing particle, the speed of the blood plasma could be determined. The depicted embodiment utilized a 200 Hz to 1000 Hz imaging frame rate, which offered sufficient speed to trace cell flows inside blood vessels, including thick blood vessels in which the flow rate is very high. From these results it was possible to compare the flow speed before and during running of the subject to reveal activity in different regions of the brain.

Figure 8J:
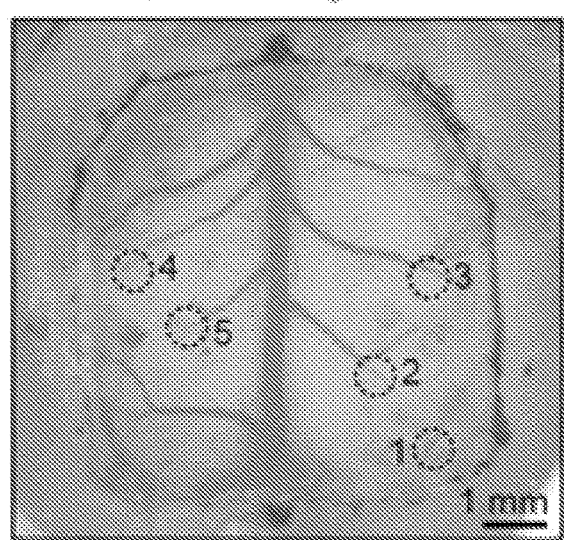
Figure 8K:
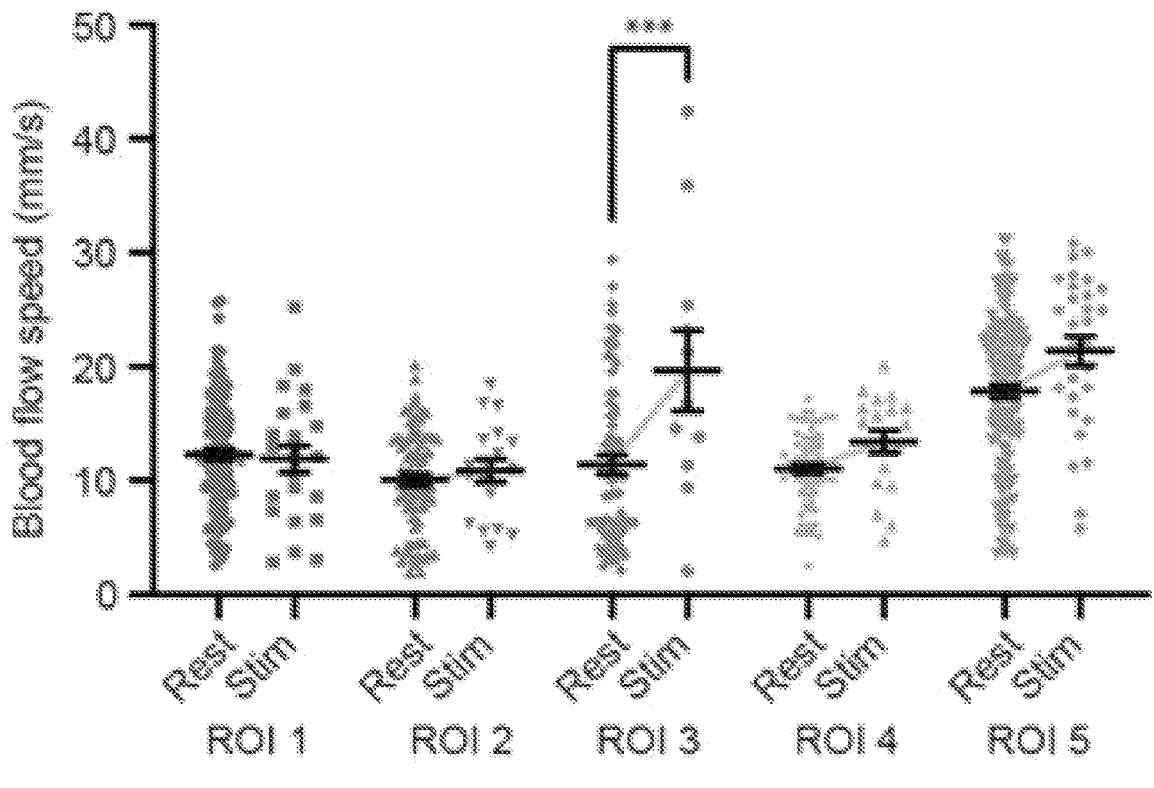
Figure 8L:
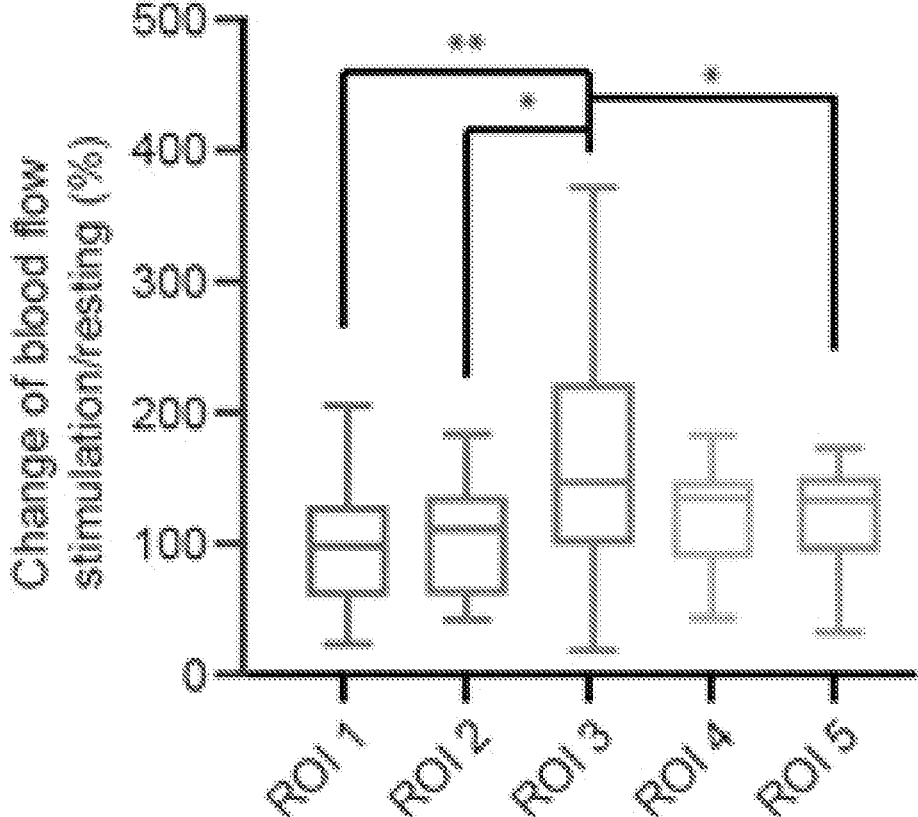

FIG. 8J depicts five regions of interest (ROIs) of the test subject (circled regions 1-5) where blood flow was evaluated. FIG. 8K depicts the results of testing showing blood flow at rest and during stimulation. And, FIG. 8L reflects that ROI3 appeared to have the largest increase in blood flow due to stimulation of the whisker 240.

Various aspects of different embodiments of the present disclosure are expressed in paragraphs X1, X2, and X3, as follows:

X1. One embodiment of the present disclosure includes an apparatus, comprising: a laser beam sequencer configured and adapted to receive a laser beam and sequence the laser beam into laser pulses beginning at different times; a laser beam splitter configured and adapted to receive a laser beam and direct the laser beam along at least two spatially separated laser beam pathways; and a laser beam reflector defining a reflective surface configured and adapted to reflect laser light and defining an edge; wherein the moving laser beam reflector is positioned to receive laser light that has been sequenced by the laser beam sequencer and directed along the at least two spatially separated laser beam pathways by the laser beam splitter, wherein the moving laser beam reflector is positioned with the at least two different laser beam pathways intersecting the reflective surface of the moving laser beam reflector at two different locations, wherein the moving laser beam reflector and the laser beam sequencer are synchronized to have laser light turned off in one of the at least two laser beam pathways as the edge of the reflective surface approaches the one laser beam pathway and to have laser light turned on in the other of the at least two laser beam pathways as the laser light turns off in the one of the laser beam pathways;

X2. Another embodiment of the present disclosure includes a system, comprising: an acoustic optical deflector configured for connection to a laser, wherein the acoustic optical deflector is positioned to receive laser light from a laser and configured to sequentially separate the laser light into at least first and second laser light pathways when connected to the laser; a light separator connected to the acoustic optical deflector and configured to receive light traveling in the second laser light pathway and increase the separation between the second laser light pathway and the first laser light pathway; and a rotating polygonal reflector connected to the acoustic optical deflector, the rotating polygonal reflector defining a plurality of reflective surfaces and an edge between two adjacent reflective surfaces, the reflective surfaces being configured to reflect laser light, the rotating polygonal scanner being positioned to receive light traveling in the first laser light pathway and to receive light traveling in the second laser light pathway after being separated from the first laser light pathway by the light separator.

X3. Another embodiment of the present disclosure includes a method, comprising: receiving laser light; sequencing the laser light into time separated laser pulses; separating the laser light into spatially separated laser pathways; moving a reflective surface with at least one edge across the spatially separated laser pathways; reflecting the time and spatially separated laser pulses off the moving reflective surface; and synchronizing the laser light pulses with the moving reflective surface, wherein said synchronizing results in terminating a light pulse traveling in a first laser pathway and initiating a light pulse traveling in a second laser pathway as the first laser pathway approaches an edge of the reflective surface.

Yet other embodiments include the features described in any of the previous statements X1, X2 or X3, as combined with (i) one or more of the previous statements X1, X2 or X3, (ii) one or more of the following aspects, or (iii) one or more of the previous statements X1, X2 or X3 and one or more of the following aspects:

Wherein the moving laser beam reflector is rotating.

A laser pathway combiner configured and adapted to combine at least two different laser beam pathways emanating from the moving laser beam reflector.

An objective lens configured to receive the laser light emanating from a laser pathway combiner and focus the laser light on a sample.

Wherein the laser beam sequencer and the laser beam splitter are combined in an acoustic optical deflector.

A second laser beam splitter configured and adapted to receive laser light from the acoustic optical deflector and to increase the separation between the at least two spatially separated laser beam pathways.

Wherein the rotating laser beam reflector defines multiple reflective surfaces, each reflective surface configured and adapted to reflect laser light and defining an edge, where in one edge is located between two adjacent reflective surfaces.

Wherein the laser beam splitter is configured and adapted to receive a laser beam and direct the laser beam along at least four spatially separated laser beam pathways, the at least four spatially separated laser beam pathways including two groups of laser beam pathways, wherein the distance between the two groups of pathways is greater than the distance between the pathways in either of the two groups of pathways.

Wherein the rotating laser beam reflector and the laser beam sequencer are synchronized to have laser light turned off in one of the two groups of laser beam pathways as the edge of the reflective surface approaches the one of the two groups of laser beam pathways and to have laser light turned on in the other group of the two groups of laser beam pathways as the laser light turns off in the one of the two groups of laser beam pathways.

Wherein the distance between the two groups of pathways is greater than the distance between the pathways in either of the two groups of pathways at the location where the two groups of pathways intersect the reflective surface of the rotating laser beam reflector.

Wherein the number of the at least four spatially separated laser beam pathways equals the number of reflective surfaces of the rotating laser beam reflector.

A laser connected to the laser beam sequencer and the laser beam splitter and configured and adapted to emit a laser beam to the laser beam sequencer and the laser beam splitter.

Wherein the rotating polygonal reflector and the acoustic optical deflector are synchronized to change the laser light pathway in which the laser light is traveling from the first laser light pathway to the second laser light pathway when the first laser light pathway approaches an edge of the polygon scanner. Wherein the light separator is a mirror positioned in the second laser light pathway and positioned outside the first laser light pathway.

A first micromirror array and a first microlens array, the first micromirror array being positioned to receive light traveling from the acoustic optical deflector in the first laser light pathway and to reflect the light traveling from the acoustic optical deflector in the first laser light pathway toward the first microlens array, the first microlens array being configured to increase the mode spacing of the light traveling in the first laser light pathway as it travels to the rotating polygonal reflector.

A second micromirror array and a second microlens array, the second micromirror array being positioned to receive light traveling from the light separator in the second laser light pathway and to reflect the light traveling from the light separator in the second laser light pathway toward the second microlens array, the second microlens array being configured to increase the mode spacing of the light traveling in the second laser light pathway as it travels to the rotating polygonal reflector.

Wherein the rotating polygonal reflector and the acoustic optical deflector are synchronized and achieve a 100% duty cycle.

A beam splitter configured to receive light traveling in the first and second laser light pathways after reflection off the rotating polygonal reflector and to combine the first and second laser light pathways into a single laser light pathway.

An objective lens configured to receive light traveling in the single laser light pathway emanating from the beam splitter and deliver the laser light to a sets sample.

A laser connected to the acoustic optical deflector.

Combining the spatially separated laser pathways into a single laser light pathway.

Focusing the single laser light pathway on a target.

Imaging the laser light reflecting off the target.

Wherein said moving includes rotating the reflective surface.

Generating laser light prior to said receiving.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

ELEMENT NUMBERING

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

| | |
|---|---|
| 100 | optical gearbox system |
| 101 | laser |
| 102 | laser beam |
| 103 | prism |
| 104 | laser pathway |
| 106 | laser pathway group |
| 108 | mirror |
| 110 | acoustic optical deflector (AOD) |
| 112 | telecentric lens |
| 114 | cylindrical lens |
| 116 | half-wave plate |
| 118 | mirror array |
| 120 | lens array |
| 150 | polygon scanner |
| 151 | polygon surface |
| 152 | edge |
| 154 | incident beam location |
| 155 | center location |
| 159 | rotation direction |
| 160 | galvanometer |
| 162 | piezo stage |
| 170 | polarizing beam splitter |
| 172 | dichroic beam splitter |
| 180 | objective lens |
| 182 | optical filter |
| 190 | optical detector |
| 210 | treadmill |
| 211 | cell |
| 212 | cell |
| 220 | imaging pathway |
| 221 | imaging layer |
| 222 | imaging layer |
| 223 | imaging layer |
| 224 | imaging layer |
| 225 | imaging layer |
| 230 | blood vessel |
| 231 | blood vessel wall |
| 233 | fluorophore |
| 235 | blood vessel |
| 236 | blood vessel wall |
| 237 | fluorophore |
| 240 | whisker |
| 241 | transparent window |
| 243 | three-dimensional (xyz) piezo stage |
| 245 | syringe |
| 247 | air nozzle |

What is claimed is:

1. An apparatus, comprising:
    a laser beam sequencer configured and adapted to receive a laser beam and sequence the laser beam into laser pulses beginning at different times;

a first laser beam splitter configured and adapted to receive a laser beam and direct the laser beam along at least two spatially separated laser beam pathways;

a rotating laser beam reflector defining a reflective surface configured and adapted to reflect laser light and defining an edge, wherein the rotating laser beam reflector is positioned to receive laser light that has been sequenced by the laser beam sequencer and directed along the at least two spatially separated laser beam pathways by the first laser beam splitter, the rotating laser beam reflector is positioned with the at least two different laser beam pathways intersecting the reflective surface of the rotating laser beam reflector at two different locations, the rotating laser beam reflector and the laser beam sequencer are synchronized to have laser light turned off in one of the at least two laser beam pathways as the edge of the reflective surface approaches the one laser beam pathway and to have laser light turned on in the other of the at least two laser beam pathways as the laser light turns off in the one of the laser beam pathways;

a laser pathway combiner configured and adapted to combine the at least two different laser beam pathways emanating from the rotating laser beam reflector; and an objective lens configured to receive the laser light emanating from the laser pathway combiner and focus the laser light on a sample.

2. The apparatus of claim 1, wherein the laser beam sequencer and the first laser beam splitter are combined in an acoustic optical deflector.

3. The apparatus of claim 2, further comprising:

a second laser beam splitter configured and adapted to receive laser light from the acoustic optical deflector and to increase the separation between the at least two spatially separated laser beam pathways.

4. The apparatus of claim 1, wherein the rotating laser beam reflector defining multiple reflective surfaces, each reflective surface configured and adapted to reflect laser light and defining an edge, where in one edge is located between two adjacent reflective surfaces.

5. The apparatus of claim 1, wherein the first laser beam splitter is configured and adapted to receive a laser beam and direct the laser beam along at least four spatially separated laser beam pathways, the at least four spatially separated laser beam pathways including two groups of laser beam pathways, wherein the distance between the two groups of pathways is greater than the distance between the pathways in either of the two groups of pathways, and wherein the rotating laser beam reflector and the laser beam sequencer are synchronized to have laser light turned off in one of the two groups of laser beam pathways as the edge of the reflective surface approaches the one of the two groups of laser beam pathways and to have laser light turned on in the other group of the two groups of laser beam pathways as the laser light turns off in the one of the two groups of laser beam pathways.

6. The apparatus of claim 5, wherein the rotating laser beam reflector is positioned with the at least four spatially separated laser beam pathways intersecting the reflective surface of the rotating laser beam reflector in two groups, wherein the distance between the two groups of pathways is greater than the distance between the pathways in either of the two groups of pathways at the location where the two groups of pathways intersect the reflective surface of the rotating laser beam reflector.

7. The apparatus of claim 6, wherein the number of the at least four spatially separated laser beam pathways equals the number of reflective surfaces of the rotating laser beam reflector.

8. The apparatus of claim 7, further comprising:

a laser connected to the laser beam sequencer and the first laser beam splitter and configured and adapted to emit a laser beam to the laser beam sequencer and the first laser beam splitter.

9. The apparatus of claim 1, wherein the laser beam sequencer and the first laser beam splitter are combined in an acoustic optical deflector, the apparatus further comprising:

a second laser beam splitter configured and adapted to receive laser light from the acoustic optical deflector and to increase the separation between the at least two spatially separated laser beam pathways, wherein the acoustic optical deflector is configured and adapted to receive a laser beam and direct the laser beam along at least four spatially separated laser beam pathways, the at least four spatially separated laser beam pathways including two groups of laser beam pathways, wherein the distance between the two groups of pathways is greater than the distance between the pathways in either of the two groups of pathways, and the rotating laser beam reflector defines at least two reflective surfaces and at least one edge separating the at least two reflective surfaces, each of the at least two reflective surfaces configured and adapted to reflect laser light, wherein the rotating laser beam reflector is positioned with the at least four spatially separated laser beam pathways intersecting the at least two reflective surfaces of the rotating laser beam reflector in two groups, wherein the distance between the two groups of pathways is greater than the distance between the pathways in either of the two groups of pathways at the location where the two groups of pathways intersect the at least two reflective surfaces of the rotating laser beam reflector, and the rotating laser beam reflector and the acoustic optical deflector are synchronized to have laser light turned off in one of the two groups of laser beam pathways as the at least one edge separating the at least two reflective surfaces approaches the one of the two groups of laser beam pathways and to have laser light turned on in the other group of the two groups of laser beam pathways as the laser light turns off in the one of the two groups of laser beam pathways.

10. A system, comprising:

an acoustic optical deflector configured for connection to a laser, wherein the acoustic optical deflector is positioned to receive laser light from a laser and configured to sequentially separate the laser light into at least first and second laser light pathways when connected to the laser;

a light separator connected to the acoustic optical deflector and configured to receive light traveling in the second laser light pathway and increase the separation between the second laser light pathway and the first laser light pathway; and a rotating polygonal reflector connected to the acoustic optical deflector, the rotating polygonal reflector defining a plurality of reflective surfaces and an edge between two adjacent reflective surfaces, the reflective surfaces being configured to reflect laser light, the rotating polygonal reflector being positioned to receive light traveling in the first laser light pathway and to receive light traveling in the second laser light pathway after being separated from the first laser light pathway by the light separator;

wherein the rotating polygonal reflector and the acoustic optical deflector are synchronized to change the laser light pathway in which the laser light is traveling from the first laser light pathway to the second laser light pathway when the first laser light pathway approaches an edge of the rotating polygonal reflector.

11. The apparatus of claim 10, wherein the light separator is a mirror positioned in the second laser light pathway and positioned outside the first laser light pathway.

12. The apparatus of claim 11, further comprising:

a first micromirror array and a first microlens array, the first micromirror array being positioned to receive light traveling from the acoustic optical deflector in the first laser light pathway and to reflect the light traveling from the acoustic optical deflector in the first laser light pathway toward the first microlens array, the first microlens array being configured to increase the mode spacing of the light traveling in the first laser light pathway as the light travels to the rotating polygonal reflector; and a second micromirror array and a second microlens array, the second micromirror array being positioned to receive light traveling from the light separator in the second laser light pathway and to reflect the light traveling from the light separator in the second laser light pathway toward the second microlens array, the second microlens array being configured to increase the mode spacing of the light traveling in the second laser light pathway as the light travels to the rotating polygonal reflector.

13. The apparatus of claim 11, wherein the rotating polygonal reflector and the acoustic optical deflector are synchronized and achieve a 100% duty cycle.

14. The apparatus of claim 10, further comprising:

a beam splitter configured to receive light traveling in the first and second laser light pathways after reflection off the rotating polygonal reflector and to combine the first and second laser light pathways into a single laser light pathway; and an objective lens configured to receive light traveling in the single laser light pathway emanating from the beam splitter and deliver the laser light to a target sample.

15. The apparatus of claim 10, further comprising:

a laser connected to the acoustic optical deflector;

a first micromirror array and a first microlens array, the first micromirror array being positioned to receive light traveling from the acoustic optical deflector in the first laser light pathway and to reflect the light traveling from the acoustic optical deflector in the first laser light pathway toward the first microlens array, the first microlens array being configured to increase the mode spacing of the light traveling in the first laser light pathway as the light travels to the rotating polygonal reflector; and a second micromirror array and a second microlens array, the second micromirror array being positioned to receive light traveling from the light separator in the second laser light pathway and to reflect the light traveling from the light separator in the second laser light pathway toward the second microlens array, the second microlens array being configured to increase the mode spacing of the light traveling in the second laser light pathway as the light travels to the rotating polygonal reflector;

a beam splitter configured to receive light traveling in the first and second laser light pathways after reflection off the rotating polygonal reflector and to combine the first and second laser light pathways into a single laser light pathway;

an objective lens configured to receive light traveling in the single laser light pathway emanating from the beam splitter and deliver the laser light to a target; and an optical detector configured to receive light reflected from the target.

16. A method, comprising:

receiving laser light;

sequencing the laser light into time separated laser pulses;

separating the laser light into spatially separated laser pathways;

moving a reflective surface with at least one edge across the spatially separated laser pathways;

reflecting the time and spatially separated laser pulses off the moving reflective surface; and synchronizing the laser light pulses with the moving reflective surface, wherein said synchronizing results in terminating a light pulse traveling in a first laser pathway and initiating a light pulse traveling in a second laser pathway as the first laser pathway approaches an edge of the reflective surface.

17. The method of claim 16, further comprising:

combining the spatially separated laser pathways into a single laser light pathway; and focusing the single laser light pathway on a target.

18. The method of claim 17, further comprising:

imaging the laser light reflecting off the target.

19. The method of claim 18, wherein said moving includes rotating the reflective surface.

20. The method of claim 18, further comprising:

generating laser light prior to said receiving.

* * * * *